(12) United States Patent
Gerspacher

(10) Patent No.: US 6,277,350 B1
(45) Date of Patent: Aug. 21, 2001

(54) CARBON BLACK AND RUBBER PRODUCTS AND METHODS OF FORMING SUCH PRODUCTS

(75) Inventor: Michel Gerspacher, Azle, TX (US)

(73) Assignee: Sid Richardson Carbon, Ltd., Ft. Worth, TX (US)

( * ) Notice: Subject to any disclaimer, the term of this patent is extended or adjusted under 35 U.S.C. 154(b) by 0 days.

(21) Appl. No.: 09/186,261

(22) Filed: Nov. 4, 1998

(51) Int. Cl.$^7$ .................................................. C01D 3/00
(52) U.S. Cl. ............................................................ 423/449.1
(58) Field of Search .......................................... 423/449.1

(56) References Cited

U.S. PATENT DOCUMENTS

| | | |
|---|---|---|
| 5,231,129 | 7/1993 | Misono . |
| 5,232,974 | 8/1993 | Branan, Jr. et al. . |
| 5,321,072 | 6/1994 | Misono . |
| 5,393,821 | 2/1995 | Shieh et al. . |
| 5,484,836 | 1/1996 | Kikuchi et al. . |

Primary Examiner—Edward J. Cain
(74) Attorney, Agent, or Firm—William D. Harris, Jr.; Locke Liddell & Sapp LLP

(57) ABSTRACT

Carbon black is produced by introducing a carbon black feedstock, along with hot combustion gases, into the reaction zone of a carbon black furnace where the feedstock is partially burned and thermally decomposed to form carbon black. A hydrogen donor, such as ammonia gas, is simultaneously introduced into the reaction zone of the furnace from an extraneous source. The added hydrogen reduces the rate at which the carbon black feedstock is dehydrogenated. Carbon black aggregates produced in the reaction zone have surfaces characterized by reduced crystallite formation and an increased presence of amorphous carbon. The hydrogen content of the carbon black is also increased. This reduces the surface activity of the carbon black, making it more readily dispersible in elastomers, and improves the properties of such rubber compounds.

12 Claims, 2 Drawing Sheets

(1 of 2 Drawing Sheet(s) Filed in Color)

CARBON BLACK AND RUBBER PRODUCTS AND METHODS OF FORMING SUCH PRODUCTS

BACKGROUND OF THE INVENTION

1. Field of the Invention

This invention pertains to new carbon black and rubber products and more particularly to improved carbon blacks that can be incorporated into elastomers for manufacture of tire rubber compounds characterized by low hysteresis and reduced rolling resistance.

2. Description of the Prior Art

Carbon blacks are produced in great quantities throughout the world. They are commonly used as reinforcing agents for elastomers, and as fillers and/or colorants for plastics, paints and printing inks. The largest use for carbon black is to impart strength and wear resistance to the elastomer compounds employed in the manufacture of pneumatic tires for motor vehicles and aircraft. In tires, carbon black greatly improves the abrasion resistance and traction of the tread rubber, but can also affect the hysteresis of the rubber compound and hysteresis of the tires. This latter property relates to the loss of energy that occurs as a result of deformation of a tire as it rolls over a surface such as a road or highway. A tire formed from a rubber compound with a low hysteresis value will have a reduced resistance to rolling, which is beneficial.

Carbon blacks are formed in special furnaces wherein a fuel is burned in a combustion zone with excess oxygen that is typically supplied as a stream of air or as an air/oxygen mixture. Within a reaction zone of the furnace, carbon black feedstock, which may be in the form of a highly aromatic, high molecular weight hydrocarbon oil, is commingled with the highly heated, oxygen-containing combustion gases from the combustion zone, and the carbon black feedstock is partially burned, thermally decomposed and dehydrogenated within the reaction zone to produce an aerosol comprising particulate carbon black suspended in the gaseous products of reaction. The aerosol is cooled by quenching with water and the carbon black particles are separated from the remaining gases and vapors and collected. The resultant carbon black particles, which are collected as a fluffy powder, can be densified by use of conventional pelletizing methods.

During the carbon black formation process, the carbon black particles form aggregates that loosely cling together as "soft" agglomerates. As seen by means of an electron microscope, the carbon black aggregates appear as spherical particles fused together to form a cluster. Commercial grades of carbon black are identified by the size and physical/chemical characteristics of the aggregates as measured by ASTM testing procedures which are well known to those skilled in the art.

The surfaces of the carbon black aggregates comprise carbon atoms in both amorphous and crystalline forms. FIG. 1 depicts a carbon black aggregate where the darker areas represent the crystallites and the lighter areas correspond to the amorphous carbon. Amorphous carbon has no crystalline or organized structure. Within crystallites, however, the carbon atoms are arranged in an organized fashion and exist in planar layers having well defined edges. These crystallites typically have an average width of about 25 Å and are approximately 12 Å thick. The extent of edge exposure presented by the planar edges of the crystallites, and more specifically, the extent to which the conduction electrons at the crystallite edges are able to interact with other materials, such as rubber during compounding and curing, is a measure of the "surface activity" of the carbon black. Carbon blacks that have surfaces that are too "active" tend to disperse poorly in elastomers, and will not exhibit optimum performance upon cure of the rubber compounds that contain the carbon black. The terms "surface activity," "activity," and "active," as used herein, refer to the interactive nature of carbon black to form its own network and interact with an elastomer as the result of crystallite presence on the surface of carbon black aggregates as described herein.

Due to the aforementioned problems that can be associated with carbon blacks having a high surface activity, what is needed are carbon blacks with a reduced degree of surface activity whereby dispersion in elastomer compounds is improved and production of new and improved vulcanizates can be achieved.

SUMMARY OF THE INVENTION

A novel carbon black product and method of forming such carbon black is provided. The carbon black product comprises a carbon black having a hydrogen content of at least about 3500 ppm, and an aggregate surface with at least about 40% of the surface area carbon as amorphous carbon and less than about 60% of the surface area carbon as crystallites. In one particular embodiment, the carbon black has an aggregate surface ranging from about 50 to 60% of the surface area carbon as crystallite, and in another embodiment, an aggregate surface ranging from about 40 to 50% of the surface area carbon as crystallite. The carbon black may also have a nitrogen adsorption surface area ($N_2SA$) ranging from about 20 to 160 $m^2/g$, with a preferred range of about 85 to 105 $m^2/g$, and a compressed dibutyl phthalate absorption (CDBP) ranging from about 50 to 120 ml/100 g, with a preferred range from about 80 to 90 ml/100 g.

The carbon black of the invention can be used to form an improved rubber composition, wherein the composition is comprised of an elastomer component and a carbon black having a hydrogen content of at least about 3500 ppm and an aggregate surface with at least about 40% amorphous carbon, and where the elastomer component is present in an amount of about 100 parts by weight and the carbon black is present in an amount ranging from about 20 to 150 parts by weight.

The carbon black of the invention is produced by burning a fuel to form hot combustion gases. A reaction mixture of the hot combustion gases and a carbon black feedstock, which may be provided by a hydrocarbon oil, is then formed and extraneous hydrogen is introduced into the reaction mixture. The reaction mixture is then allowed to react to form carbon black. The extraneous hydrogen may be provided by hydrogen gas or ammonia gas, in particular embodiments.

BRIEF DESCRIPTION OF THE DRAWINGS

The file of this patent contains at least one drawing executed in color. Copies of this patent with color drawing(s) will be provided by the Patent and Trademark Office upon request and upon payment of the necessary fee.

DETAILED DESCRIPTION OF THE PREFERRED EMBODIMENT

Compared to carbon blacks of the same particle size that are produced by conventional methods, carbon blacks of the present invention have an increased amount of amorphous carbon and a decreased amount of crystallites on the surfaces of the aggregates. This is accomplished by regulating the dehydrogenation of the carbon black feedstock. By slowing the dehydrogenation rate, the rate of crystallite formation is suppressed while formation of amorphous carbon is simultaneously enhanced. Prior to the present invention, it was not possible to obtain carbon black of a particular grade wherein the form of carbon present at the surface of the carbon black aggregates is controlled during the manufacturing process to produce a greater proportion of amorphous carbon and thereby affect the surface activity of the carbon black.

The method of the invention has particular application to the production of oil furnace carbon blacks. It has been discovered for example, that the rate of dehydrogenation of a carbon black feedstock oil within the reaction zone of a furnace to form carbon blacks can be slowed down by the introduction of hydrogen or a hydrogen donor compound as a source of extraneous hydrogen. This may be in the form of hydrogen gas or hydrogen containing compounds such as ammonia gas ($NH_3$). The hydrogen or hydrogen donor compound is introduced from an external source into the reaction zone. During typical oil furnace black production methods, the hydrocarbon material of the raw carbon black feedstock is partially burned, thermally decomposed, and dehydrogenated. It is believed that introduction of extraneous hydrogen into the reaction zone, in accordance with the invention, reduces the dehydration rate of the feedstock and in turn delays the formation of crystallites and promotes formation of amorphous carbon since the amorphous carbon is the intermediate stage between aromatic species and turbostratic crystallite.

Figure 1:
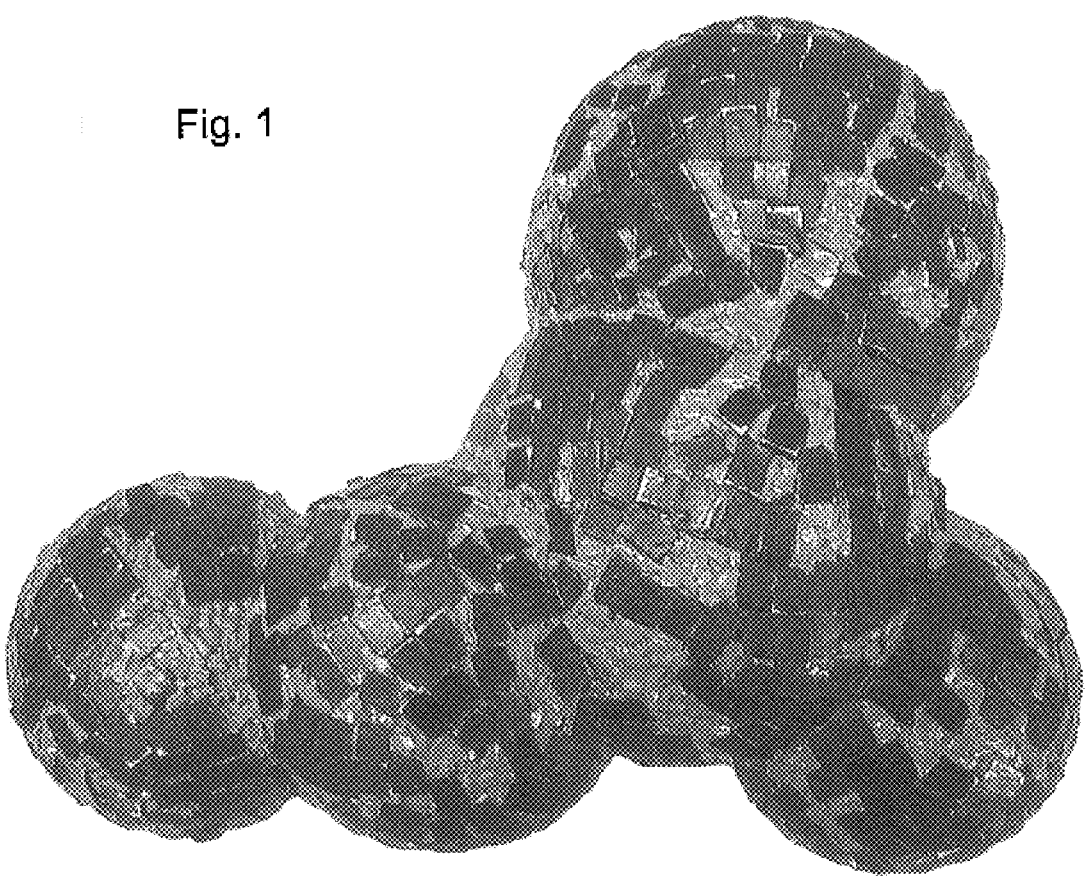
FIG. 1 is a depiction of a carbon black aggregate, produced in accordance with the invention.
Figure 2:
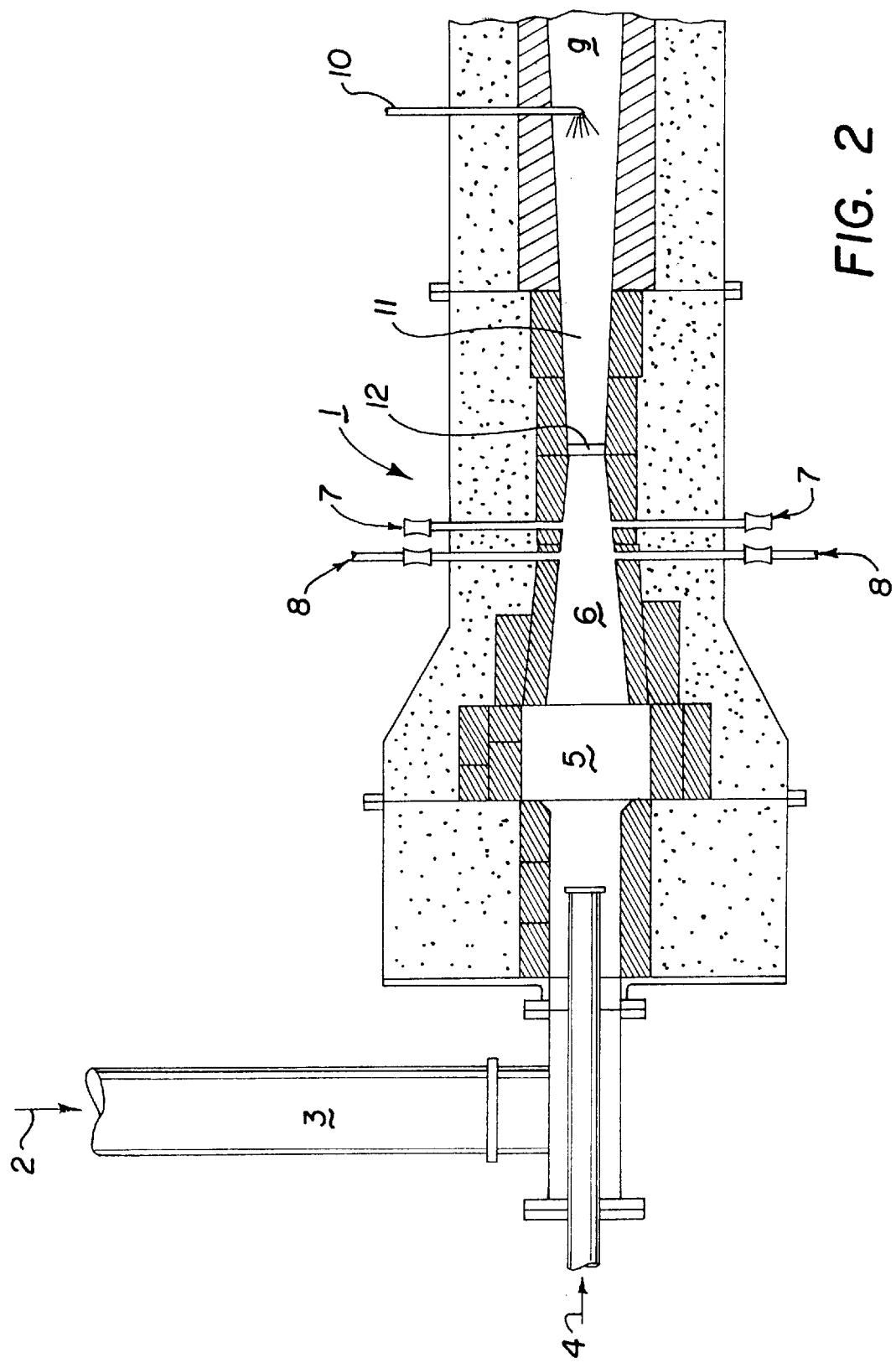
FIG. 2 is a cross-sectional view of a carbon black furnace that may be used in the production of carbon black in accordance with the invention.

FIG. 2 shows a double-tapered carbon black furnace used in producing the carbon black of the invention. The furnace 1 has an initial combustion chamber 5 where a combustible fuel is introduced through inlet 4. Oxygen for combustion of the fuel is introduced from a supply source 2 through inlet 3. The oxygen is usually supplied in the form of air, but may also be supplied as pure oxygen or as an air/oxygen mixture. When air and natural gas are used to form a combustion mixture, an air to fuel ratio of between about 15/1 to 20/1 by volume is typically employed. The air may be preheated to a temperature of 1500° F. prior to introducing into the furnace.

A carbon black producing feedstock is introduced into the furnace 1 through a separate inlet located at point 7. The carbon black feedstock can be a hydrocarbon liquid vapor or gas, such as natural gas, but is preferably a liquid in the form of a high molecular weight, polynuclear aromatic hydrocarbon oil, such as fuel oil or a carbon black feedstock oil, preferably with a BMCI between 110 and 140. The combustion gases from the combustion chamber 5 and carbon black feedstock are passed into a reaction chamber 6 where partial combustion and conversion of the feedstock to carbon black occurs. The fuel burned within the combustion chamber 5 should produce a furnace temperature within the reaction chamber 6 of between about 2100 to 3300° F. to ensure proper decomposition of the carbon black feedstock. The hydrogen donor source is also introduced into the reaction zone 6 to delay the dehydrogenation of the feedstock during the reaction to produce the desired carbon black. Hydrogen or a hydrogen donor is introduced at inlet 8 into the reaction zone 6 wherein the carbon black feedstock is converted into an aerosol of carbon black suspended in the gaseous final products. This carbon black aerosol is next passed to a quench zone 9 where water is introduced at 10 to cool the carbon black. The cooled carbon black is then separated from the gases and other vapors using conventional separation methods. The carbon black is collected and may be pelletized, if desired, using well-known pelletizing techniques.

The rate at which the hydrogen or hydrogen donor is fed into the reaction zone is controlled and maintained to achieve the desired amount of reduction in the dehydrogenation rate of the feedstock hydrocarbon to produce the desired aggregate carbon black. A feed rate of ammonia gas ($NH_3$) of between about 250 to 1500 SCFH for 4 lbs/min of carbon black feedstock has been found to achieve the desired reductions in dehydrogenation of the carbon black feedstock. Comparable feed rates of other hydrogen sources can be determined based on their stoichiometric equivalents to that of ammonia gas.

The required location for introducing the extraneous hydrogen into the reaction zone of the furnace will depend upon the furnace design and the operating conditions employed, but can be determined by experimentation. It will be appreciated that the added hydrogen or hydrogen donor must be injected so as to commingle with reaction zone constituents and be present during dehydrogenation of the feedstock in order to produce carbon black aggregates with increased amounts of amorphous carbon and hydrogen, as previously described. As shown in FIG. 2, the hydrogen or hydrogen donor can be introduced proximal and upstream of the feedstock introduction point.

The amount of carbon as crystallites on particular grades of carbon black without addition of extraneous hydrogen, may be well over 60% of the surface area carbon, with between 60 to 100% of the surface area carbon being typical. Measurements for crystallite and amorphous carbon as described herein are determined by Raman spectrographic measurements. With the introduction of hydrogen, as described above, the amount of carbon as crystallite on the carbon black surfaces of the same grade can be reduced to below 60% of the surface area carbon, and can be from about 50 to 60%. Further, carbon black aggregates having surface carbon within the ranges of between about 40 to 50% as crystallite can be readily produced using the methods described herein. Similarly, with the reduction of crystallite formation, the formation of amorphous carbon on the aggregate surface is increased. For example, the amount of surface carbon as crystallites, for a particular grade of carbon black, can be reduced from 60% to 40% on the aggregate surfaces, while amorphous carbon is increased from 40 to 60% of the surface area carbon.

The reduction of crystallite formation on the aggregate surfaces using the methods disclosed herein is also accompanied by an increased hydrogen content of the carbon black. This increase in the hydrogen content of the carbon black can be as much as 30% greater than those produced by conventional methods. Carbon black produced in accordance with the invention can have a hydrogen content of between about 3500 to 5000 ppm by weight as measured by Leco Hydrogen Analysis. Carbon black produced using conventional methods typically contains between about 2000 to 2500 ppm of hydrogen as measured by this test. The increased hydrogen content is important due to its effect on the surface activity of the carbon black. Carbon black crystallites are made up of carbon atoms with predominantly $sp^2$ orbitals and therefore have a high number of conjugated double bonds. Amorphous carbons, however, are made up of carbon atoms having some $sp^3$ orbitals and result in a lower surface density of conduction electrons.

Reduction of crystallite formation on the aggregate surfaces, in combination with an increase in hydrogen content, effects reduction of the surface activity of carbon black to an extent that the dispersibility of the carbon black in elastomer compounds is significantly improved. Surface activity can be measured in terms of the carbon black's nitrogen adsorption. The nitrogen adsorption of carbon black is an indirect measure of the quantity of carbon black surface active sites. A decrease in the nitrogen adsorption may indicate less crystallographic structure and more amorphous carbon.

An important physical parameter of the carbon black is the compressed dibutyl phthalate absorption (CDBP). This test measures the void volume that exists among the carbon black aggregates. A given amount of carbon black is mixed with dibutyl phthalate in an internal mixer. A rise in mixing torque per volume of liquid introduced is a measure of total void volume among all of the aggregates. The following examples give a better understanding of the carbon blacks produced and their method of formation. ASTM procedures exist and are generally available for measuring various characteristics of carbon black, including procedures for measuring nitrogen surface area ($N_2SA$) and crushed dibutylphthalate absorption (CDBP).

EXAMPLE 1

A furnace as depicted in FIG. 2 was used to produce carbon blacks with and without introduction of hydrogen into the reaction zone. Combustion chamber 5 of the furnace had a diameter of 10 inches and a length of 19 inches. The convergent section 6 of the reaction zone had an entrance diameter of 3.75 inches, a length of 34 inches, and exit diameter of 1.75 inches at the choke 12. The divergent section 11 of the reaction zone had an entrance diameter of 1.75 inches, a length of 67 inches, and an exit diameter of 3.75 inches.

Air and natural gas were introduced into combustion chamber 5 at rates of 14,000 and 819 SCFH, respectively. The mixture was burned to produce hot combustion gases. Carbon black feedstock oil having a BMCI of 135 was introduced into convergent zone 6 through injectors 7 at rates indicated in Table 1. Ammonia gas, when employed, was introduced into the convergent zone 6 through injectors 8 at rates indicated in Table 1 as well. The resulting carbon black aerosols were quenched in zone 9 of the furnace by introduction of sprayed water from injector 10.

Table 1 presents the process conditions and properties of carbon blacks produced during Runs 1–6. No extraneous hydrogen was added during Runs 2, 5, and 7. Ammonia gas was used as a hydrogen donor during Runs 1, 3, 4, and 6 to provide a hydrogen-rich atmosphere within the reaction zone.

Measurements for nitrogen surface adsorption ($N_2SA$) were made according to the B.E.T. (ASTM D-4820) method. Hydrogen content was determined by LECO Hydrogen Analyzer. The compressed dibutyl phthalate absorption (CDBP) was determined according to procedures set forth in ASTM D-3493. The ratio of amorphous carbon to total carbon was determined using Raman spectroscopy. Reference Paper 39, Rubber Division ACS Indianapolis, 1998 describes this advanced technique in detail.

TABLE 1

| | Process Conditions | | | | Carbon Black Properties | | | $I_{am}/I_{total}$ |
|---|---|---|---|---|---|---|---|---|
| Run # | Oil Rate (lbs/mn) | Air/Gas Ratio | Air Rate (SCFH) | $NH_3$ (SCFH) | CDBP (ml/100 g) | $N_2SA$ ($m^2$/g) | Hydrogen ppm | Raman Spectroscopy |
| 1 | 4.4 | 17 | 14,000 | 750 | 102 | 92 | 3620 | .1 |
| 2 | 4.4 | 17 | 14,000 | 0 | 100 | 103 | 3058 | .06 |
| 3 | 4.0 | 17 | 14,000 | 300 | 97 | 112 | 3050 | * |
| 4 | 4.0 | 17 | 14,000 | 750 | 96 | 106 | 3297 | .13 |
| 5 | 4.0 | 17 | 14,000 | 0 | 100 | 122 | 2896 | 0 |
| 6 | 4.0 | 17 | 15,000 | 1500 | 95 | 108 | 3240 | .13 |
| 7 | 4.0 | 17 | 15,000 | 0 | 102 | 153 | 2450 | 0 |

The carbon blacks have particular application for use in rubber formulations. The carbon blacks of the invention are used in an amount ranging from about 20 to 150 phr (parts per 100 parts rubber) by weight. The following further illustrates the use of carbon blacks of the invention in rubber compounds.

EXAMPLE 2

The carbon blacks of Example 1, as listed in Table 1, were each mixed separately in a rubber compound in accordance with ASTM D3191. Test results for each of the resulting compounds are shown in Table 2. For each carbon black sample, the $G''_{max}$ value was determined by ARES Spectrometer. The following results were obtained.

TABLE 2

| | A | B | | C Elect. | D |
|---|---|---|---|---|---|
| Run | µg. Cr(VI) Reduced | G' max MPa | G" max MPa | Resistivity MSL – cm | Microdispersion RA ($\mu$) |
| 1 | 88.7 | 6.5 | 1.0 | 5.2 | — |
| 2 | 98.6 | 7.2 | 1.2 | 1.3 | — |
| 3 | 107.7 | 8.1 | 1.3 | — | .33 |
| 4 | 102.9 | 7.9 | 1.3 | — | .32 |
| 5 | 115.7 | 9.1 | 1.5 | — | .45 |
| 6 | 108.2 | 8.2 | 1.3 | 5 | — |
| 7 | 129.5 | 9.8 | 1.7 | 1 | — |

A. Chromium VI reduction to Chromium III per the procedure presented during the ACS Rubber Division meeting, May 1996. The larger the concentration of the conduction electron on the carbon surface, the more Chromium VI is reduced to Chromium III. Therefore a lesser reduction of Chromium VI indicates a less reactive surface.

B. Low Strain Dynamic Properties (ARES Spectrometer) to assess the maximum of the loss modulus ($G''_{max}$) and the elastic modulus ($G'_{max}$), the lower these maxima, the better dispersed is the carbon black from the same family.

A better dispersion in identical mixing sequences indicates less interactions between the aggregates.

C. Electrical Resistivity using the alternative polarity method from Keithley Electronics (reference Paper 27 from ITEC 98). A greater resistivity is due to a better dispersion of carbon black from the same family.

D. Microdispersion using a stylus roughness tester capable of determining the Ra of a surface. The rougher the surface, the larger the Ra, indicating poorer dispersion of the carbon black.

The carbon blacks of the invention are an improvement over the prior art. They have a reduced amount of carbon as crystallites and an increased amount of amorphous carbon on the aggregate surfaces, and an increased hydrogen content. This results in a reduction in the surface activity of the carbon black and thereby provides improved dispersibility in elastomer compositions. Improved properties and characteristics of resultant cured rubber compounds are accordingly observed. The carbon blacks are easily prepared in an effective and reliable manner by the introduction of extraneous hydrogen or a hydrogen donor compound into the reaction zone of the furnace where the carbon black is formed.

While the invention has been shown in certain forms, it should be apparent to those skilled in the art that it is not so limited, but is susceptible to various changes without departing from the scope of the invention.

I claim:

1. A carbon black product comprising:

a carbon black having a hydrogen content of at least about 3500 ppm and an aggregate surface with at least about 40% of the surface area carbon as amorphous carbon and less than about 60% of the surface area carbon as crystallites.

2. The carbon black product of claim 1, wherein:

the carbon black has an aggregate surface ranging from about 50 to 60% of the surface area carbon as crystallite.

3. The carbon black product of claim 1, wherein:

the carbon black has an aggregate surface ranging from about 40 to 50% of the surface area carbon as crystallite.

4. The carbon black product of claim 1, wherein:

the carbon black has a hydrogen content ranging from about 3500 to 5000 ppm.

5. The carbon black product of claim 1, wherein:

the carbon black has a nitrogen adsorption surface area ($N_2SA$) ranging from about 20 to 160 $m^2/g$ and a compressed dibutyl phthalate absorption (CDBP) ranging from about 50 to 120 ml/100 g.

6. The carbon black product of claim 1, wherein:

the carbon black has a nitrogen adsorption surface area ($N_2SA$) ranging from about 85 to 105 $m^2/g$ and a compressed dibutyl phthalate absorption (CDBP) ranging from about 80 to 90 ml/100 g.

7. A rubber composition comprising:

an elastomer component and a carbon black having a hydrogen content of at least about 3500 ppm and an aggregate surface with at least about 40% of the surface area carbon as amorphous carbon.

8. A rubber composition as in claim 7, wherein:

the carbon black is present in the amount ranging from about 20 to 150 phr.

9. A method of producing carbon black comprising:

a) burning a fuel to form hot combustion gases;

b) forming a reaction mixture of the hot combustion gases and a carbon black feedstock;

c) introducing extraneous hydrogen into the reaction mixture; and d) allowing the mixture to react to form carbon black.

10. The method of claim 9, wherein:

the carbon black feedstock is a hydrocarbon oil.

11. The method of claim 9, wherein:

the source of the extraneous hydrogen is ammonia.

12. The method of claim 9, wherein:

the source of the extraneous hydrogen is hydrogen gas.

* * * * *